US012673502B2

(12) United States Patent
Kimura et al.

(10) Patent No.: US 12,673,502 B2
(45) Date of Patent: Jul. 7, 2026

(54) LIQUID EJECTION DEVICE

(71) Applicant: SEIKO EPSON CORPORATION, Tokyo (JP)

(72) Inventors: Naomi Kimura, Okaya (JP); Shoma Kudo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 18/538,674

(22) Filed: Dec. 13, 2023

(65) Prior Publication Data

US 2024/0198688 A1 Jun. 20, 2024

(30) Foreign Application Priority Data

Dec. 16, 2022 (JP) ................................ 2022-200936

(51) Int. Cl.

*B41J 2/175* (2006.01)
*B41J 2/165* (2006.01)
*B41J 2/17* (2006.01)

(52) U.S. Cl.

CPC ....... *B41J 2/17566* (2013.01); *B41J 2/16508* (2013.01); *B41J 2/16517* (2013.01); *B41J 2/16523* (2013.01); *B41J 2/1721* (2013.01)

(58) Field of Classification Search

CPC ......................... B41J 2/17566; B41J 2/16508; B41J 2/16517; B41J 2/16523; B41J 2/1721; B41J 2/17509; B41J 29/02

See application file for complete search history.

(56) References Cited

U.S. PATENT DOCUMENTS

2016/0263900 A1 9/2016 Kimura et al.
2020/0070509 A1 3/2020 Oguchi et al.

FOREIGN PATENT DOCUMENTS

JP 2016-168723 A 9/2016
JP 2020-032570 A 3/2020
WO WO-2021038747 A1 * 3/2021 ............. B41J 29/38

* cited by examiner

*Primary Examiner* — Justin Seo

(74) *Attorney, Agent, or Firm* — WORKMAN NYDEGGER

(57) ABSTRACT

A liquid ejection device regulates discharge of liquid from a liquid ejection head after a remaining amount detection section detects that remaining amount of liquid contained in a liquid container falls below a first threshold in a case where instruction related to disposal is not input by an input section, and allows discharge of the liquid from the liquid discharge head after the remaining amount detection section detects that the remaining amount of the liquid contained in the liquid container falls below the first threshold in a case where the instruction regarding disposal is input by the input section.

11 Claims, 6 Drawing Sheets

LIQUID EJECTION DEVICE

The present application is based on, and claims priority from JP Application Serial Number 2022-200936, filed Dec. 16, 2022, the disclosure of which is hereby incorporated by reference herein in its entirety.

BACKGROUND

1. Technical Field

The present disclosure relates to a liquid ejection device configured to eject liquid.

2. Related Art

For example, JP-A-2016-168723 discloses a liquid ejection device that performs recording on a medium by discharging liquid supplied from a liquid container from a liquid ejection head. In addition, such a liquid ejection device is configured to regulate the ejection of the liquid from the liquid ejection head and to notify that the remaining amount of the liquid falls below the threshold when the remaining amount of the liquid contained in the liquid container falls below a threshold.

However, in such a liquid ejection device, since the liquid supplied from the liquid container remains in the liquid ejection device, the liquid ejection device is contaminated by the remaining liquid when the liquid ejection device is disposed. Therefore, there is a possibility that the recyclability of the liquid ejection device is impaired.

SUMMARY

To solve the above problems, a liquid ejection device includes a liquid ejection head configured to eject liquid contained in a liquid container; a remaining amount detection section configured to detect the remaining amount of the liquid contained in the liquid container; an input section configured to input a predetermined instruction; and a control section configured to perform control based on the instruction input by the input section, wherein when an instruction related to disposal is not input by the input section, the control section regulates discharge of the liquid from the liquid ejection head after the remaining amount detection section detects that the remaining amount of the liquid contained in the liquid container falls below a first threshold and when the instruction related to disposal is input by the input section, the control section allows discharge of the liquid from the liquid ejection head after the remaining amount detection section detects that the remaining amount of the liquid contained in the liquid container falls below the first threshold.

DESCRIPTION OF EMBODIMENTS

First Embodiment

Hereinafter, an embodiment of the liquid ejection device will be described with reference to the drawings.

Configuration of Liquid Ejection Device 11

Figure 1:
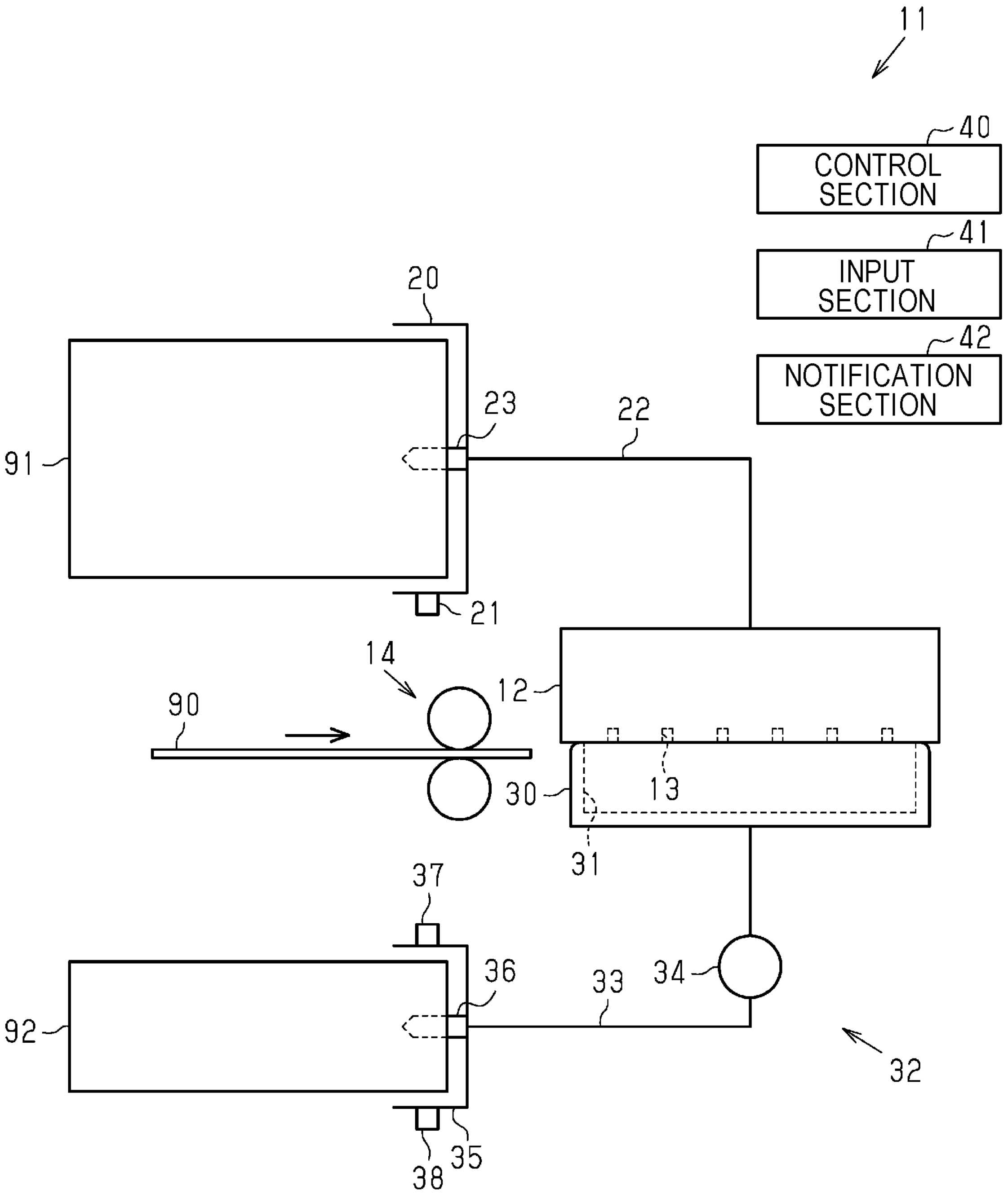
FIG. 1 is a schematic diagram of a liquid ejection device.

As shown in FIG. 1, a liquid ejection device 11 is configured to perform printing by ejecting a liquid onto a medium 90. The liquid ejection device 11 may be an inkjet type printer that performs printing by ejecting ink, which is an example of the liquid, onto the medium 90. The medium 90 may be, for example, paper, fabric, vinyl, plastic parts, metal parts, or the like.

The liquid ejection device 11 includes a liquid ejection head 12. The liquid ejection head 12 is configured to eject the liquid to the medium 90. The liquid ejection head 12 is configured to eject the liquid contained in a liquid container 91 (to be described later).

The liquid ejection head 12 includes a plurality of nozzles 13. The liquid ejection head 12 performs printing by ejecting the liquid from each of the plurality of nozzles 13 to the medium 90. The liquid ejection head 12 may be a serial type or a line type. In the serial type, printing is performed by ejecting the liquid onto the medium 90 while the liquid ejection head 12 is moving. In the line type, the liquid ejection head 12 is elongated in the width direction of the medium 90, and printing is performed by ejecting the liquid to the medium 90.

The liquid ejection device 11 may include a transport section 14. The transport section 14 is configured to transport the medium 90. The transport section 14 transports the medium 90 from a medium accommodation section (not shown) to the liquid ejection head 12. The transport section 14 transports the medium 90 printed by the liquid ejection head 12 to outside the liquid ejection device 11. The transport section 14 may include a roller.

The liquid ejection device 11 may include a mount section 20. The liquid container 91 is attachable to and detachable from the mount section 20. The mount section 20 may be capable of mounting a plurality of liquid containers 91 corresponding to liquid colors. The liquid container 91 contains the liquid to be supplied to the liquid ejection head 12. The liquid container 91 may be an ink cartridge.

The liquid ejection device 11 may include a remaining amount detection section 21. The liquid ejection device 11 may be provided with a plurality of remaining amount detection sections 21 corresponding to the liquid colors. The remaining amount detection section 21 is configured to detect the remaining amount of the liquid contained in the liquid container 91. The remaining amount detection section 21 may be a sensor or the like.

The liquid ejection device 11 may include a supply flow path 22. The liquid ejection device 11 may include a plurality of supply flow paths 22 corresponding to liquid colors. When the liquid container 91 is mounted on the mount section 20, the supply flow path 22 is a flow path for supplying the liquid from the liquid container 91 to the liquid ejection head 12. When the liquid container 91 is mounted on the mount section 20, an upstream end of the supply flow path 22 is connected to the liquid container 91. A downstream end of the supply flow path 22 is connected to the liquid ejection head 12.

The supply flow path 22 may be capable of leading out the liquid contained in the liquid container 91 by insertion of a supply needle 23 into the liquid container 91 mounted on the mount section 20. The supply flow path 22 may supply the liquid by water head. The liquid ejection device 11 may include a pump (not shown) that supplies the liquid from the liquid container 91 to the liquid ejection head 12.

The liquid ejection device 11 may include a cap 30. The cap 30 is capable of receiving the liquid discharged from the liquid ejection head 12. The cap 30 may be movable between a contact position shown in FIG. 1 and a separated position (not shown). The contact position is a position where the cap 30 is in contact with the liquid ejection head 12. The separated position is a position where the cap 30 is separated from the liquid ejection head 12.

When the cap 30 is positioned at the contact position, the cap 30 forms a closed space 31 in which each of the plurality of nozzles 13 opens. Maintenance in which the cap 30 forms the closed space 31 so as to surround the plurality of nozzles 13 is also referred to as capping.

The cap 30 may receive the liquid ejected from the liquid ejection head 12 when the cap 30 is positioned at the separated position. Maintenance for ejecting the liquid from the liquid ejection head 12 is also referred to as flushing.

The liquid ejection device 11 may include a cleaning section 32. The cleaning section 32 can perform cleaning. The cleaning is maintenance in which the liquid is forcibly discharged from each of the plurality of nozzles 13 via the closed space 31. Thus, the cleaning section 32 can forcibly discharge the liquid from the liquid ejection head 12.

The cleaning section 32 may include a waste liquid flow path 33 and a suction pump 34. The waste liquid flow path 33 is a flow path for, when a waste liquid container 92 (to be described later) is mounted on a waste liquid mount section 35, discharging liquid, as waste liquid, from the cap 30 to the waste liquid container 92. An upstream end of the waste liquid flow path 33 is connected to the cap 30. When the waste liquid container 92 is mounted on the waste liquid mount section 35, the downstream end of the waste liquid flow path 33 is connected to the waste liquid container 92. The waste liquid flow path 33 may be capable of leading out the liquid as waste liquid to the waste liquid container 92 by a discharge needle 36 being inserted into the waste liquid container 92 mounted on the waste liquid mount section 35.

The suction pump 34 can depressurize the space in the cap 30 through the waste liquid flow path 33. The cleaning section 32 performs cleaning by driving the suction pump 34 in a state where the cap 30 is positioned at the contact position. That is, the cleaning section 32 depressurizes the closed space 31. By this, the liquid is discharged from each of the plurality of nozzles 13, and the liquid is supplied from the supply flow path 22 to the liquid ejection head 12.

The cleaning section 32 may discharge the liquid in the cap 30 by driving the suction pump 34 in a state where the cap 30 is positioned at the separated position. Maintenance for sending the liquid in the cap 30 to a waste liquid container 92 (to be described later) is also referred to as idle suction.

The liquid ejection device 11 may include the waste liquid mount section 35. The waste liquid container 92 is attachable to and detachable from the waste liquid mount section 35. The waste liquid container 92 can contain the liquid as waste liquid discharged from the liquid ejection head 12 by the cleaning section 32.

The liquid ejection device 11 may be provided with a waste liquid detection section 37. The waste liquid detection section 37 can detect the contained amount of the waste liquid in the waste liquid container 92. The waste liquid detection section 37 may be a sensor or the like.

The liquid ejection device 11 may include a container type detection section 38. The container type detection section 38 can detect whether or not the waste liquid container 92 is mounted on the waste liquid mount section 35. The container type detection section 38 can detect the type of waste liquid container 92 mounted on the waste liquid mount section 35. The container type detection section 38 may be a sensor or the like.

The liquid ejection device 11 includes a control section 40 and an input section 41. The liquid ejection device 11 may include a notification section 42. The control section 40 generally controls the driving of each mechanism in the liquid ejection device 11 and controls various operations executed in the liquid ejection device 11.

The control section 40 can be configured as a circuit including α: one or more processors that execute various processes according to a computer program, β: one or more dedicated hardware circuits that execute at least some of the various processes, or γ: a combination thereof. The hardware circuit is, for example, an application specific integrated circuit. The processor includes a CPU and memory, such as RAM and ROM, which stores program code or instructions configured to cause the CPU to perform processing. The memory, that is, the computer readable medium, includes any readable medium that can be accessed by a general purpose or dedicated computer.

The input section 41 is capable of inputting a predetermined instruction. The input section 41 is capable of inputting various instructions relating to the liquid ejection device 11. The input section 41 is configured as an operation section operable by a user, but may be configured so that the predetermined instruction input in a terminal device (not shown) is input. In this case, the input section 41 may be configured separately from the control section 40 or may be configured to be included in the control section 40.

The notification section 42 performs notification relating to the liquid ejection device 11. It is sufficient as long as the notification section 42 is at least one of a display section capable of displaying an image, a sound output section capable of outputting a sound, and a light emission section capable of emitting light in a predetermined light emission mode. The notification section 42 is not provided in the liquid ejection device 11 and may be provided in a terminal device (not shown). In this case, the control section 40 outputs a notification instruction to the terminal device (not shown) so that the notification section 42 may perform notification based on the notification instruction.

In the present embodiment, the control section 40 may control the liquid ejection head 12, the transport section 14, the cap 30, and the cleaning section 32. In addition, the control section 40 can recognize a detection result based on detection signals from the remaining amount detection section 21, the waste liquid detection section 37, and the container type detection section 38. The control section 40 performs control based on the instruction input by the input section 41. The control section 40 causes the notification section 42 to perform notification relating to the liquid ejection device 11.

In particular, when a disposal instruction is input by the input section 41, the control section 40 sets the control mode to a disposal mode. The disposal instruction is an instruction related to disposal. The disposal instruction is indicated by the user or a service person. The control mode includes a normal mode and a disposal mode. The normal mode is a control mode for performing printing. The disposal mode is different from the normal mode and is a control mode for disposal of the liquid ejection device 11.

The control section 40 can execute a discharge control when the disposal mode is set as the control mode. The discharge control is a control for discharging the liquid remaining in the liquid container 91 and the liquid ejection device 11.

Specifically, when the control mode is set to the disposal mode, the control section 40 may execute an overlap printing control as the discharge control. The overlap printing control is a control for causing the liquid to be ejected from the liquid ejection head 12 onto a predetermined region of the medium 90 in a larger ejection amount than when the normal mode is set. The predetermined region is a region having the same area when the control mode is set to the normal mode and when the control mode is set to the disposal mode. The overlap printing control may be a control that is not performed in the normal mode.

As a specific example, in the normal mode, the control section 40 ejects the liquid in an ejection amount corresponding to image data included in the print instruction. On the other hand, in the disposal mode, the control section 40 may eject a larger ejection amount of the liquid than in the normal mode by ejecting liquid in an overlapping manner on the predetermined region of the medium 90. In the disposal mode, the control section 40 may perform solid printing in which the predetermined region of the medium 90 is covered with the liquid. In the disposal mode, the control section 40 may eject the liquid onto the predetermined region of the medium 90 a plurality of times in an overlapping manner.

When performing the overlap printing control, a medium 90 for overlap printing may be used, but a normal medium 90 may also be used. The medium 90 for overlap printing is a medium that absorbs a larger amount of liquid than the normal medium 90.

In this way, when the control mode is set to the disposal mode, the control section 40 performs control such that the overlap printing control to thereby control the liquid remaining in the liquid container 91 and the liquid ejection device 11 to be ejected from the liquid ejection head 12.

Disposal Mode Control Process

Here, the disposal mode control process will be described with reference to FIG. 2. The disposal mode control process is a process executed by the control section 40 at predetermined intervals.

Figure 2:
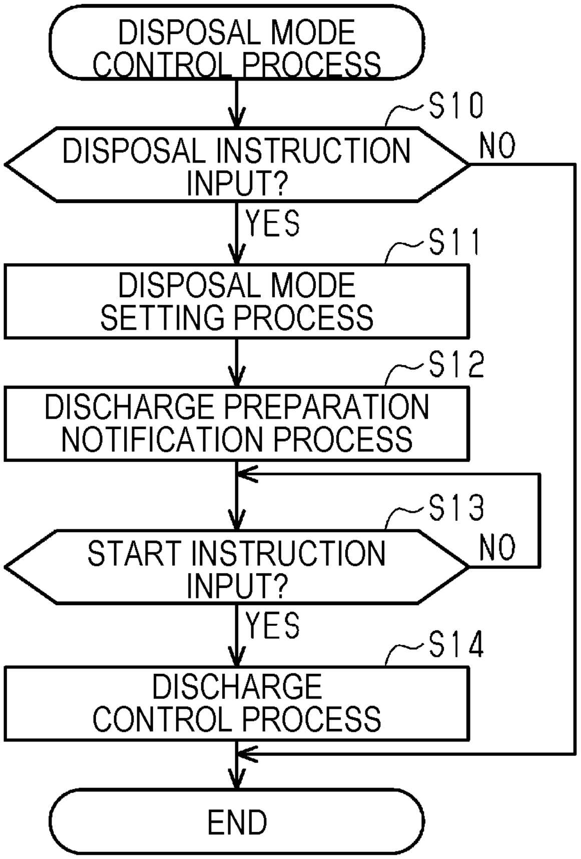
FIG. 2 is a flowchart showing a disposal mode control process.

As shown in FIG. 2, in step S10, the control section 40 determines whether a disposal instruction has been input by the input section 41. When the control section 40 determines that the disposal instruction was not input by the input section 41, the control section 40 ends the disposal mode control process without executing steps S11 to S14. On the other hand, when the control section 40 determines that the disposal instruction has been input by the input section 41, the control section 40 shifts the processing to step S11.

In step S11, the control section 40 executes a disposal mode setting process. In this process, the control section 40 sets the control mode to the disposal mode. While the control mode is set to the disposal mode, the control section 40 may cause the notification section 42 to notify that the control mode is set to the disposal mode. When this process ends, the process shifts to step S12.

In step S12, the control section 40 executes a discharge preparation notification process. In this process, the control section 40 causes the notification section 42 to notify relating to the preparation for the discharge control. Specifically, the control section 40 may cause the notification section 42 to perform a notification for prompting the user to place the medium 90 for overlap printing or the normal medium 90 in the medium accommodation section as the notification regarding the preparation of the discharge control. When this process is ended, the control section 40 shifts the process to step S13.

In step S13, the control section 40 determines whether a start instruction has been input by the input section 41. The start instruction is an instruction for starting the discharge control. When the control section 40 determines that the start instruction has not been input by the input section 41, the control section 40 shifts the process to step S13 again. On the other hand, when the control section 40 determines that the start instruction has been input by the input section 41, the control section 40 shifts the process to step S14. That is, in step S13, the control section 40 waits for the input of the start instruction.

In step S14, the control section 40 executes a discharge control process. The control section 40 executes discharge control. Specifically, the control section 40 controls the transport section 14 so as to transport the medium 90 for overlap printing or the normal medium 90 placed in the medium accommodation section, and controls the liquid ejection head 12 so as to perform the overlap printing control. By this, when the control mode is set to the disposal mode, the control section 40 can execute control for ejecting a larger ejection amount of the liquid from the liquid ejection head 12 to the predetermined region of the medium 90 than when the control mode is not set to the disposal mode.

When the end condition of the discharge control is satisfied, the control section 40 ends the discharge control processing. The end condition of the discharge control may be satisfied when there is no medium 90 to be transported. The end condition of the discharge control may be satisfied when the remaining amount of the liquid contained in the liquid container 91 runs out. The end condition of the discharge control may be satisfied when the liquid of a predetermined ejection amount is ejected after the remaining amount of the liquid contained in the liquid container 91 runs out. The end condition of the discharge control may be satisfied when a prescribed time required for ejecting the predetermined ejection amount of the liquid has elapsed after the remaining amount of the liquid contained in the liquid container 91 runs out. The end condition of the discharge control may be satisfied when an end instruction of the discharge control is issued from the user or the service engineer. The end condition of the discharge control may be satisfied when a power-off instruction of the liquid ejection device 11 is issued. When the end condition of the discharge control is satisfied and the discharge control process ends, the control section 40 ends the disposal mode control process.

Remaining Amount Monitoring Process

Next, the remaining amount monitoring process will be described with reference to FIG. 3. The remaining amount monitoring process is a process executed by the control section 40 at predetermined intervals. In particular, the remaining amount monitoring process is a process executed by the control section 40 at predetermined intervals both when printing is performed in the normal mode and when discharge control is performed in the disposal mode.

Figure 3:
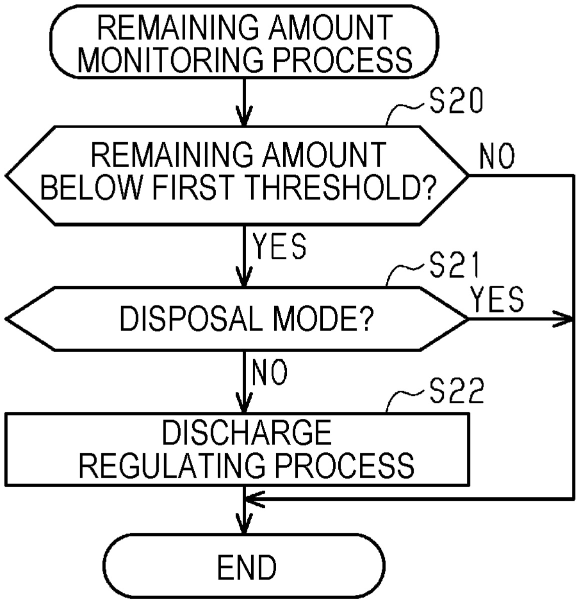
FIG. 3 is a flowchart showing a remaining amount monitoring process.

As shown in FIG. 3, in step S20, the control section 40 determines, based on the signal from the remaining amount detection section 21, whether the remaining amount of the liquid contained in the liquid container 91 falls below the first threshold. The first threshold corresponds to the remaining amount of liquid required during printing in the normal mode. When the control section 40 determines that the remaining amount of the liquid contained in the liquid container 91 does not fall below than the first threshold, the control section 40 ends the remaining amount monitoring process without executing steps S21 and S22. On the other hand, when the control section 40 determines that the remaining amount of the liquid contained in the liquid container 91 falls below than the first threshold, the control section 40 shifts the process to step S21.

In step S21, the control section 40 determines whether the control mode is set to the disposal mode. When the control section 40 determines that the control mode is set to the disposal mode, the control section 40 ends the remaining amount monitoring process without executing step S22. On the other hand, when the control section 40 determines that the control mode is not set to the disposal mode, the control section 40 shifts the process to step S22.

In step S22, the control section 40 executes a discharge regulating process. In this process, the control section 40 regulates the discharge of liquid from the liquid ejection head 12. As a specific example, when the printing is performed in the normal mode, the control section 40 regulates printing by regulating the transport of the medium 90 by the transport section 14 and the ejection of liquid of the liquid ejection head 12. On the other hand, when the discharge control is performed in the disposal mode, the control section 40 allows the discharge control without regulating transport of the medium 90 by the transport section 14 and ejection of liquid from the liquid ejection head 12. When the discharge regulating process is ended, the control section 40 ends the remaining amount monitoring process.

As described above, when the disposal instruction is not input by the input section 41, the control section 40 does not set the control mode to the disposal mode. When the control mode is not set to the disposal mode, when the remaining amount detection section 21 detects that the remaining amount of the liquid contained in the liquid container 91 falls below the first threshold, then the control section 40 regulates ejection of liquid from the liquid ejection head 12. That is, the control section 40 does not allow liquid to be discharged from the liquid ejection head 12.

On the other hand, when the disposal instruction is input by the input section 41, the control section 40 sets the control mode to the disposal mode. When the control mode is set to the disposal mode, the control section 40 does not regulate ejection of liquid from the liquid ejection head 12, even when the remaining amount detection section 21 detects that the remaining amount of the liquid contained in the liquid container 91 falls below the first threshold. That is, the control section 40 allows the liquid to be discharged from the liquid ejection head 12.

Operation and Effects of First Embodiment

The operation and effect of the first embodiment will be described.

(1-1) In the related art, for example, if the liquid remains in the liquid ejection device 11, when the liquid ejection device 11 is pulverized, the pulverized parts and surroundings will be contaminated with the liquid that remained in the liquid ejection device 11. For this reason, the liquid ejection device 11 cannot be received by a recycling trader. Therefore, as in the present embodiment, by the disposal instruction is input, the discharge of the liquid from the liquid ejection head 12 is allowed, even if the remaining amount of the liquid contained in the liquid container 91 falls below the first threshold. Therefore, by the disposal instruction being inputted, when the liquid ejection device 11 is recycled, it is possible to suppress the pulverized parts and the surroundings of the liquid ejection device 11 being contaminated by the liquid. Therefore, the recyclability of the liquid ejection device 11 can be improved.

(1-2) When the disposal instruction is input, it is possible to execute the overlap printing control for ejecting a larger ejection amount of liquid from the liquid ejection head 12 to the predetermined region of the medium 90 than when the disposal instruction is not input. Therefore, by inputting the disposal instruction, it is possible to efficiently discharge the liquid remaining in the liquid ejection device 11. Therefore, the recyclability of the liquid ejection device 11 can be improved.

(1-3) When the disposal instruction is input, the user is notified to place the medium 90 for absorbing the liquid ejected from the liquid ejection head 12 in the medium accommodation section. Therefore, by inputting the disposal instruction, the user can be made to recognize that the medium 90 must be placed in the medium accommodation section. Thus, the liquid ejected from the liquid ejection head 12 can be absorbed by the medium 90. Therefore, the recyclability of the liquid ejection device 11 can be improved. In particular, when the medium 90 for overlap printing is used, the larger amount of liquid can be absorbed than when the normal medium 90 is used.

Second Embodiment

Next, a second embodiment will be described. In the second embodiment, the control of discharging the liquid from the liquid ejection head 12 to the waste liquid container 92 may be executed as the discharge control. In the following description, the same components as those of the above described embodiment are denoted by the same reference symbols, and redundant description thereof will be omitted or simplified.

In the second embodiment, the waste liquid container 92 that is for normal use is attachable to and detachable from the waste liquid mount section 35, but the waste liquid container 92 that is for disposal is also detachable from and attachable to the waste liquid mount section 35. Unlike the waste liquid container 92 that is for normal use, the waste liquid container 92 that is for disposal had introduced therein in advance a curing agent having a component for curing the waste liquid. Unlike the waste liquid container 92 that is for normal use, the waste liquid container 92 that is for disposal may indicate visually that it is only for use during disposal. The curing agent may be either a polymer absorbent or gelatin. The curing agent may be a reaction liquid according to the type of liquid.

The container type detection section 38 can detect whether the type of the waste liquid container 92 mounted on the waste liquid mount section 35 is a waste liquid container 92 that is for normal use is mounted or a waste liquid container 92 that is for disposal.

Container Monitoring Process

Here, the container monitoring process will be described with reference to FIG. 4. The container monitoring process is a process executed by the control section 40 at predetermined intervals.

Figure 4:
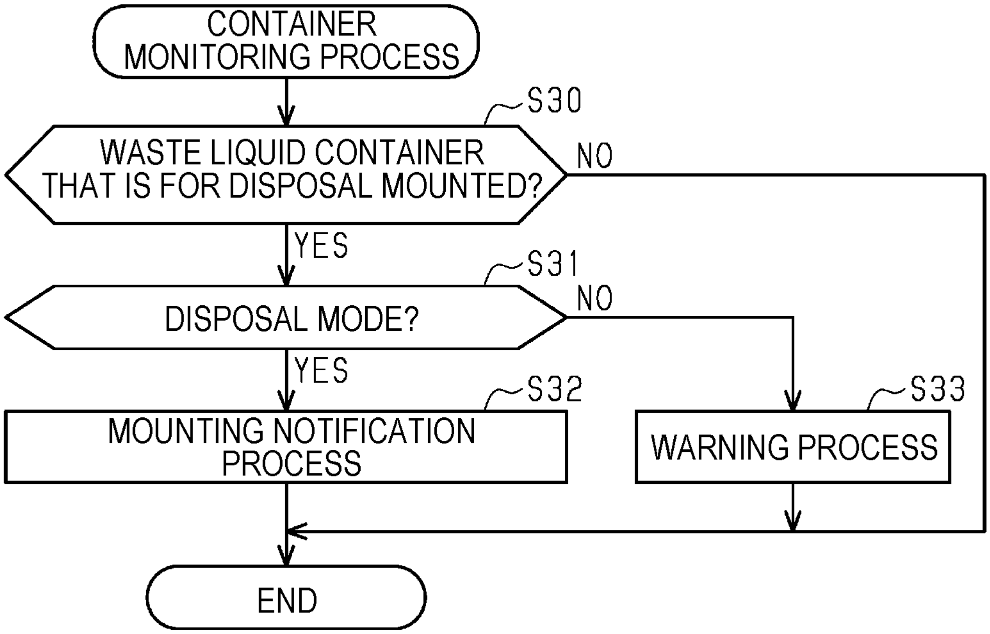
FIG. 4 is a flowchart showing a container monitoring process.

As shown in FIG. 4, in step S30, the control section 40 determines whether or not the waste liquid container 92 that is for disposal is mounted in the waste liquid mount section 35 based on signal from the container type detection section 38. When the control section 40 determines that a waste liquid container 92 that is for disposal is not mounted on the waste liquid mount section 35, the control section 40 ends the container monitoring process without executing steps S31 to S33. On the other hand, when the control section 40 determines that the waste liquid container 92 that is for disposal is mounted on the waste liquid mount section 35, the control section 40 shifts the process to step S31.

In step S31, the control section 40 determines whether the control mode is set to the disposal mode. When the control section 40 determines that the control mode is set to the disposal mode, the control section 40 shifts the process to step S32. On the other hand, when the control section 40 determines that the control mode is not set to the disposal mode, the control section 40 shifts the process to step S33.

In step S32, the control section 40 executes a mounting notification process. In this process, the control section 40 causes the notification section 42 to notify that the waste liquid container 92 that is for disposal is mounted on the waste liquid mount section 35. When the mounting notification process ends, the control section 40 ends the container monitoring process.

In step S33, the control section 40 executes a warning process. In this process, when the mode is not the disposal mode, the control section 40 causes the notification section 42 to notify that the waste liquid container 92 that is for disposal is mounted on the waste liquid mount section 35. That is, the control section 40 does not mount the waste liquid container 92 that is for disposal to the waste liquid mount section 35, and issues a warning to detach the waste liquid container 92 that is for disposal. When the warning process is ended, the control section 40 ends the container monitoring process.

Disposal Mode Control Process

Next, as shown in FIG. 2, in the disposal mode control process, in step S12, the control section 40 causes the notification section 42 to perform a notification prompting that the waste liquid container 92 that is for disposal be mounted on the waste liquid mount section 35 as a notification relating to the preparation of the discharge control. That is, when the disposal instruction is input by the input section 41, the control section 40 causes the notification section 42 to perform notification for prompting that the waste liquid container 92 that is for disposal be mounted on the waste liquid mount section 35. However, when the normal waste liquid container 92 is mounted and there is still leeway in the amount that can be accommodated by the normal waste liquid container 92, it is possible to continue to use the normal waste liquid container 92 as is, even in a state where the notification section 42 performs notification. It is also possible to continue using the normal waste liquid container 92 and then replace the waste liquid container 92 with the waste liquid container 92 that is for disposal. When this process is ended, the control section 40 shifts the process to step S13.

In step S14, the control section 40 causes the cleaning section 32 to perform cleaning of the liquid ejection head 12 as discharge control. Specifically, the control section 40 drives the suction pump 34 in a state in which the cap 30 is positioned at the contact position.

Then, the control section 40 ends the discharge control when the end condition of the discharge control is satisfied. The end condition of the discharge control may be satisfied when the remaining amount of the liquid contained in the liquid container 91 runs out. The end condition of the discharge control may be satisfied when the liquid of a predetermined ejection amount is ejected after the remaining amount of the liquid contained in the liquid container 91 runs out. The end condition of the discharge control may be satisfied when a prescribed time required for ejecting the predetermined ejection amount of the liquid has elapsed after the remaining amount of the liquid contained in the liquid container 91 runs out. The end condition of the discharge control may be satisfied when an end instruction of the discharge control is issued from the user or the service engineer. The end condition of the discharge control may be satisfied when a power-off instruction of the liquid ejection device 11 is issued. When the end condition of the discharge control is satisfied and the discharge control process ends, the control section 40 ends the disposal mode control process.

Remaining Amount Monitoring Process

Next, as illustrated in FIG. 3, in the remaining amount monitoring process, when the discharge control is performed in the discarding mode, the control section 40 allows the discharge control without performing the step S22 of regulating the cleaning of the liquid ejection head 12. That is, when the disposal instruction is input by the input section 41, the control section 40 allows the liquid to be discharged from the liquid ejection head 12 even when the remaining amount detection section 21 detects that the remaining amount of the liquid contained in the liquid container 91 falls below the first threshold.

Waste Liquid Contained Amount Monitoring Process

Next, the waste liquid contained amount monitoring process will be described with reference to FIG. 5. The waste liquid contained amount monitoring process is a process executed by the control section 40 at predetermined intervals.

Figure 5:
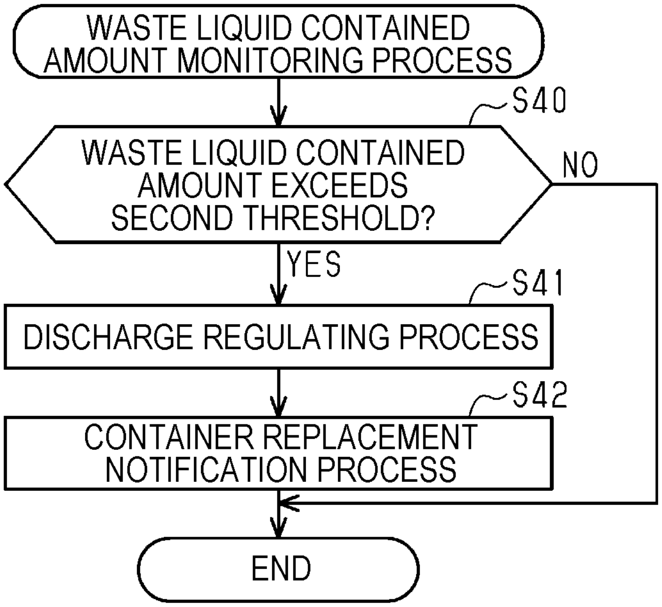
FIG. 5 is a flowchart showing a waste liquid contained amount monitoring process.

As shown in FIG. 5, in step S40, the control section 40 determines whether or not the contained amount of the waste liquid contained in the waste liquid container 92 exceeds a second threshold based on the signal from the waste liquid detection section 37.

The second threshold corresponds to the contained amount that can be contained in the waste liquid container 92 with a certain amount of leeway. The second threshold may be a constant value. The second threshold may be a value corresponding to the contained amount of the waste liquid container 92. In this case, the control section 40 specifies the type of waste liquid container 92 based on a signal from the container type detection section 38. The control section 40 may specify the contained amount of the waste liquid container 92 corresponding to the specified type of the waste liquid container 92 as the second threshold.

When the control section 40 determines that the contained amount of the waste liquid contained in the waste liquid container 92 does not exceed the second threshold, the control section 40 ends the waste liquid contained amount monitoring process without executing steps S41 and S42. On the other hand, when the control section 40 determines that the contained amount of the waste liquid contained in the waste liquid container 92 exceeds the second threshold, the control section 40 shifts the process to step S41.

In step S41, the control section 40 executes the discharge regulating process. In this process, the control section 40 regulates the discharge of liquid from the liquid ejection head 12. As a specific example, the control section 40 controls the cleaning section 32 so as to regulate cleaning of the liquid ejection head 12. When this process is ended, the control section 40 shifts the process to step S42.

In step S42, the control section 40 executes a container replacement notification process. In this process, the control section 40 causes the notification section 42 to make a notification prompting replacement of the waste liquid container 92 mounted on the waste liquid mount section 35. That is, the control section 40 causes the notification section 42 to perform a notification for prompting the user to remove the waste liquid container 92 mounted on the waste liquid mount section 35 and mount another waste liquid container 92 on the waste liquid mount section 35. When this process is ended, the control section 40 ends the waste liquid contained amount monitoring process.

In this manner, when the disposal instruction is input by the input section 41, the control section 40 allows the waste liquid to be contained in the waste liquid container 92 until the waste liquid detection section 37 detects that the contained amount of the waste liquid contained in the waste liquid container 92 exceeds the second threshold. In other words, when the disposal instruction is input by the input section 41, the control section 40 allows the liquid to be discharged from the liquid ejection head 12 until the waste liquid detection section 37 detects that the contained amount of the waste liquid contained in the waste liquid container 92 exceeds the second threshold. On the other hand, when the disposal instruction is not input by the input section 41, when the contained amount of the waste liquid contained in the waste liquid container 92 exceeds the second threshold, the control section 40 regulates waste liquid contained by the waste liquid container 92. In addition, in a process different from the waste liquid contained amount monitoring process, the control section 40 may restart the discharge control when a restart instruction is input by the input section 41.

Operation and Effects of Second Embodiment

The operations and effects of the second embodiment will be described.

(2-1) The waste liquid container 92 capable of containing the liquid as waste liquid discharged from the liquid ejection head 12 is attachable to and detachable from the waste liquid mount section 35. Therefore, the waste liquid from the liquid ejection head 12 can be discharged into the waste liquid container 92. In addition, even when the waste liquid from the liquid ejection head 12 cannot be contained in one waste liquid container 92, by mounting another waste liquid container 92, the waste liquid from the liquid ejection head 12 can be contained in mounted another waste liquid container 92. In this way, a large amount of waste liquid can be discharged from the liquid ejection head 12. Therefore, the recyclability of the liquid ejection device 11 can be improved.

(2-2) When the disposal instruction is input, containing the waste liquid by the waste liquid container 92 is allowed until the contained amount of the waste liquid contained in the waste liquid container 92 exceeds the second threshold. Therefore, by inputting the disposal instruction, the waste liquid from the liquid ejection head 12 can be efficiently discharged to the waste liquid container 92. Therefore, the recyclability of the liquid ejection device 11 can be improved.

(2-3) When the disposal instruction is input, a notification is performed that prompts that the waste liquid container 92 that is for disposal be mounted. Therefore, by inputting the disposal instruction, the user can be made to recognize that the waste liquid container 92 that is for disposal must be mounted. Thus, it is possible to increase the possibility that the waste liquid is contained in the waste liquid container 92 that is for disposal. Therefore, the recyclability of the liquid ejection device 11 can be improved.

(2-4) In the waste liquid container 92 that is for disposal, the curing agent having a component for curing the waste liquid is contained in advance. Therefore, by mounting the waste liquid container 92 that is for disposal, the waste liquid contained in the waste liquid container 92 that is for disposal can be cured by the curing agent. Thus, when the liquid ejection device 11 is recycled, it is possible to suppress that the pulverized parts and the surroundings of the liquid ejection device 11 will be contaminated by the liquid. Therefore, the recyclability of the liquid ejection device 11 can be improved.

Third Embodiment

Next, a third embodiment will be described. In the third embodiment, in addition to the first embodiment and the second embodiment, the liquid container 91 that is for disposal may be configured to be mountable on the mount section 20.

In the third embodiment, the liquid container 91 that is for normal use is attachable to and detachable from the mount section 20, but the liquid container 91 that is for disposal is also attachable and detachable. Unlike the waste liquid container 92 that is for normal use, the liquid container 91 that is for disposal has introduced therein in advance a curing liquid having a component for curing the waste liquid. Unlike the liquid container 91 that is for normal use, the liquid container 91 that is for disposal may indicate visually that it is only for use during disposal.

The curing liquid may be a reaction liquid that corresponds to the type of liquid. The curing liquid is formulated to cure the liquid after a certain period of time after mixing with the liquid. The certain period of time is desirably a period of time during which the curing liquid can be sufficiently supplied to the supply flow path 22 and the liquid ejection head 12, and may be about several hours or at least about one hour.

Disposal Mode Control Process

As shown in FIG. 2, in step S12 of the disposal mode control process, when the disposal instruction is input by the input section 41, the control section 40 causes the notification section 42 to perform the notification that prompts mounting of the liquid container 91 that is for disposal, as the notification relating to the preparation of the discharge control. When this process is ended, the control section 40 shifts the process to step S13.

Operation and Effect of Third Embodiment

The operations and effects of the third embodiment will be described.

(3-1) The liquid container 91 that is for disposal in which the curing liquid having a component for curing the liquid is contained is attachable to and detachable from the mount section 20. For this reason, by mounting the liquid container 91 that is for disposal on the mount section 20, it is possible to increase the possibility of curing the liquid from the liquid container 91 that is for disposal to the liquid ejection head 12. Thus, when the liquid ejection device 11 is recycled, it is possible to suppress that the pulverized parts and the surroundings of the liquid ejection device 11 will be contaminated by the liquid. Therefore, the recyclability of the liquid ejection device 11 can be improved.

(3-2) When the disposal instruction is input, a notification is performed that prompts that the liquid container 91 that is for disposal be mounted. Therefore, by inputting the disposal instruction, the user can be made to recognize that the liquid container 91 that is for disposal must be mounted. As described above, by mounting the liquid container 91 that is for disposal on the mount section 20, the curing liquid is supplied to the supply flow path 22 and the liquid ejection head 12. In addition, the liquid in the supply flow path 22 and the liquid ejection head 12 can be cured by the curing liquid. Thus, when the liquid ejection device 11 is recycled, it is possible to suppress that the pulverized parts and the surroundings of the liquid ejection device 11 will be contaminated by the liquid. Therefore, the recyclability of the liquid ejection device 11 can be improved.

Fourth Embodiment

Next, a fourth embodiment will be described. In the fourth embodiment, unlike the third embodiment, the liquid ejection device 11 may be configured to include a liquid container 24 instead of the configuration in which the liquid container 91 is mounted on the mount section 20.

Figure 6:
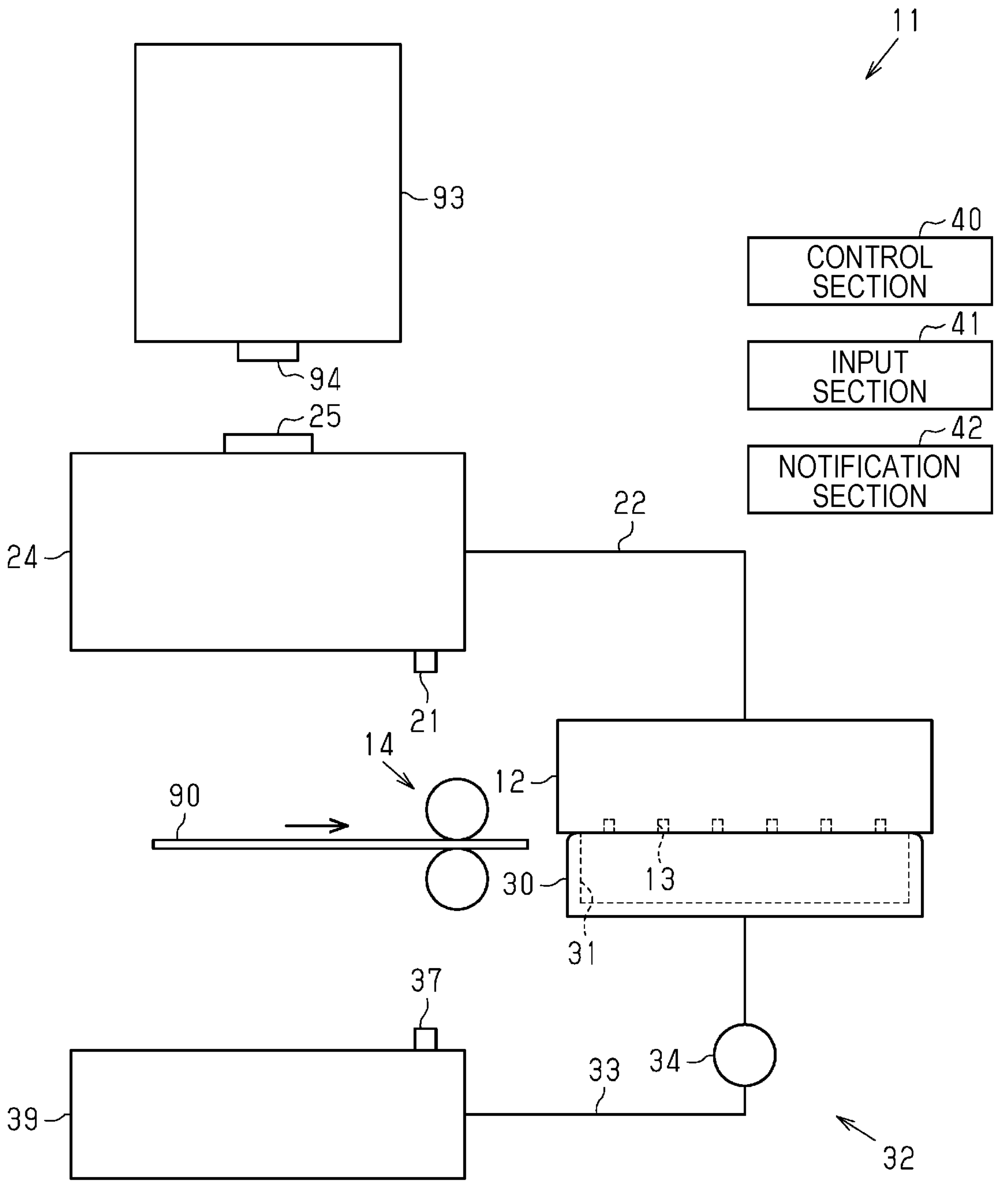
FIG. 6 is a schematic view of the liquid ejection device.

As shown in FIG. 6, in the fourth embodiment, the liquid ejection device 11 may include the liquid container 24 and not the mount section 20. The supply flow path 22 supplies the liquid from the liquid container 24 to the liquid ejection head 12.

The liquid container 24 includes an inlet 25. The insertion port 94 of a liquid vessel 93 can be inserted into the inlet 25. The liquid can be introduced into the liquid container 24 from the liquid vessel 93 via the inlet 25. The liquid container 24 may be an ink tank.

The liquid vessel 93 is a container that contains liquid to be introduced into the liquid container 24. As the liquid vessel 93, there is a liquid vessel 93 in which a normal liquid is contained and a liquid vessel 93 in which a curing liquid is contained. As described above, the liquid vessel 93 includes a curing liquid container in which the curing liquid is contained. The liquid vessel 93 may be a bottle-type vessel or a pack-type vessel as long as it can contain the curing liquid.

The liquid ejection device 11 may include a waste liquid container 39 without including the waste liquid mount section 35 and the container type detection section 38. In this case, the liquid ejection device 11 need not be provided with the waste liquid container 39 that is for disposal as long as the liquid ejection device 11 is provided with the waste liquid container 39 that is for normal use. The end condition of the discharge control is not limited to the end conditions of the discharge control described in the first embodiment to the third embodiment, and may be satisfied when the contained amount of waste liquid in the waste liquid container 39 exceeds the second threshold.

Disposal Mode Control Process

As shown in FIG. 2, in the disposal mode control process, in step S12, when the disposal instruction is input by the input section 41, the control section 40 causes the notification section 42 to perform the notification for prompting the introduction of the curing liquid into the liquid container 24 as the notification relating to the preparation of the discharge control. When this process is ended, the control section 40 shifts the process to step S13.

Operation and Effect of Fourth Embodiment

The operations and effects of the fourth embodiment will be described.

(4-1) The liquid container 24 includes the inlet 25 through which the liquid can be introduced. The insertion port 94 of the liquid vessel 93 containing the curing liquid can be inserted into the inlet 25. For this reason, by introducing the curing liquid from the liquid vessel 93 to the liquid container 24, it is possible to increase the possibility of curing the liquid from the liquid container 24 to the liquid ejection head 12. Thus, when the liquid ejection device 11 is recycled, it is possible to suppress that the pulverized parts and the surroundings of the liquid ejection device 11 will be contaminated by the liquid. Therefore, the recyclability of the liquid ejection device 11 can be improved.

(4-2) When the disposal instruction is input, a notification for prompting the introduction of the curing liquid from the liquid vessel 93 into the liquid container 24 is performed. Therefore, by inputting the disposal instruction, the user can be made aware that it is necessary to introduce the curing liquid from the liquid vessel 93 into the liquid container 24. As described above, by introducing the curing liquid from the liquid vessel 93 into the liquid container 24, the curing liquid is supplied to the supply flow path 22 and the liquid ejection head 12. In addition, the liquid in the supply flow path 22 and the liquid ejection head 12 can be cured by the curing liquid. Thus, when the liquid ejection device 11 is recycled, it is possible to suppress that the pulverized parts and the surroundings of the liquid ejection device 11 will be contaminated by the liquid. Therefore, the recyclability of the liquid ejection device 11 can be improved.

Modifications

The present embodiment can be modified as follows. The present embodiment and the following modifications can be implemented in combination with each other within a range that is not technically contradictory.

Instead of the curing liquid being introduced from the liquid vessel 93 into the liquid container 24, the notification section 42 may issue a notification to prompt the user to introduce the curing agent itself, for example, a gelatin powder, a polymer absorbent, or the like.

The discharge control may include ejection for printing, flushing, and idle suction in addition to the overlap printing and the cleaning, and it is sufficient that it include at least one of these. That is, it is sufficient as long as the discharge control is controlled for ejecting liquid remaining in the liquid ejection device 11. As the ejection for printing, it is sufficient as long as the ejection amount of the liquid is larger than that in the normal mode. When the liquid ejection head 12 is a serial type, the liquid is ejected from the liquid ejection head 12 only in one direction in the normal mode, but the liquid may be ejected from the liquid ejection head 12 in both directions in the disposal mode.

In the second embodiment, as the first waste liquid container, the waste liquid may be contained in the waste liquid container 92 that is for normal use, or the waste liquid may be contained in the waste liquid container 92 that is for disposal. In the second embodiment, after the waste liquid is contained in the first waste liquid container, the discharge control may be performed by a method of replacing the waste liquid container with the waste liquid container 92 that is for disposal, or the discharge control may be performed by a method of replacing the waste liquid container with the waste liquid container 92 that is for normal use. That is, the waste liquid container 92 that is for disposal may or may not be used.

As the discharge control, at least one of the overlap printing control, the containing of the waste liquid in the waste liquid container 92, and the supply of the curing liquid from the liquid containers 24 and 91 may be adopted, or a combination thereof may be adopted. In addition, a plurality of kinds of the discharge control may be executed at the same time regardless of the execution order.

As a specific example, after the contained amount of the waste liquid in the waste liquid container 92 reaches the second threshold, the control section 40 may cause the notification section 42 to perform a notification for urging the medium 90 for overlap printing to be placed on the medium accommodation section as the notification relating to the preparation of the discharge control. Then, when the start instruction is input by the input section 41, the control section 40 may execute the overlap printing control.

In addition, the control section 40 may calculate the amount of waste liquid until the contained amount of waste liquid in the waste liquid container 92 becomes the second threshold, and may execute the overlap printing control until the amount of liquid remaining in the liquid ejection device 11 becomes the calculated amount of waste liquid. Then, the control section 40 may contain the waste liquid in the waste liquid container 92 after executing the overlap printing control.

In addition, the control section 40 may perform the overlap printing control after the curing liquid is supplied from the liquid containers 24 and 91. The control section 40 may perform normal printing after the curing liquid is supplied from the liquid containers 24 and 91. The control section 40 may not eject the liquid from the liquid ejection head 12 after the supply of the curing liquid from the liquid containers 24 and 91. The control section 40 may not perform the cleaning, the ejection for printing, the flushing, and the idle suction after the curing liquid is supplied from the liquid containers 24 and 91.

When a selection instruction is input by the input section 41, the control section 40 may be capable of selecting the type of discharge control. As a specific example, the control section 40 may cause the notification section 42 to perform a notification for prompting the selection of the type of discharge control as the notification relating to the preparation of the discharge control. Then, when the selection instruction is input using the input section 41, the control section 40 may cause the notification section 42 to perform the notification relating to the preparation of the discharge control so as to correspond to the type of the discharge control selected by the selection instruction.

The control section 40 may detect the remaining amount of liquid in the liquid containers 24 and 91 by calculating the discharge amount of liquid discharged from the liquid ejection head 12 during printing and during maintenance. That is, the control section 40, which calculates the discharge amount of the liquid discharged from the liquid ejection head 12, may be an example of the remaining amount detection section. Further, the control section 40 may detect the remaining amount of the liquid in the liquid containers 24 and 91 by calculating the remaining amount of the liquid in the liquid containers 24 and 91 based on the signal from the remaining amount detection section 21. That is, the remaining amount detection section 21 and the control section 40 may be an example of the remaining amount detection section.

The control section 40 may detect the contained amount of waste liquid in the waste liquid container 92 by calculating the discharge amount of the liquid discharged from the liquid ejection head 12 to the waste liquid container 92 during maintenance. That is, the control section 40, which calculates the discharge amount of the liquid discharged from the liquid ejection head 12 to the waste liquid container 92, may be an example of the waste liquid detection section. In other words, the control section 40, which calculates the discharge amount of liquid contained in the waste liquid container 92 from the liquid ejection head 12 may be an example of the waste liquid detection section. In addition, the control section 40 may detect the contained amount of the waste liquid in the waste liquid container 92 by calculating the contained amount of the waste liquid in the waste liquid container 92 based on the signal from the waste liquid detection section 37. That is, the waste liquid detection section 37 and the control section 40 may be an example of the waste liquid detection section.

When the disposal instruction is input, the control section 40 may not perform the detection itself of the remaining amount of liquid in the liquid containers 24 and 91. In this case, the control section 40 may ignore the signal from the remaining amount detection section 21.

The remaining amount detection section 21 may be a connection terminal. The connection terminal can be electrically connected to a storage element incorporated in the liquid container 91. The storage element can store the remaining amount of the liquid in the liquid container 91. When the disposal instruction is input, the control section 40 may not be electrically connected to the storage element.

When the disposal instruction is input, the control section 40 may not perform the detection itself of the contained amount of waste liquid in the waste liquid container 92. In this case, the control section 40 may ignore the signal from the waste liquid detection section 37.

The waste liquid detection section 37 may be a connection terminal. The connection terminal can be electrically connected to a storage element incorporated in the waste liquid container 92. The storage element can store the contained amount of liquid in the waste liquid container 92. When the disposal instruction is input, the control section 40 may not be electrically connected to the storage element.

The control section 40 does not perform control from the disposal mode to the normal mode, but may perform control from the disposal mode to the normal mode when there is an instruction by the input section 41. In this case, the control section 40 may regulate the control from the disposal mode to the normal mode when the regulation condition is satisfied. The regulation condition may be satisfied when the curing liquid is supplied from the liquid containers 24 and 91 to the liquid ejection head 12. The regulation condition may be satisfied when there is an instruction of discharge control in which the curing liquid is supplied from the liquid containers 24 and 91 to the liquid ejection head 12.

The liquid ejection device 11 may include a detection section capable of detecting the type of the liquid container 91 mounted on the mount section 20. Accordingly, the control section 40 can detect whether the liquid container 91 mounted on the mount section 20 is the liquid container 91 that is for normal use or the liquid container 91 that is for disposal. When the mode is not the disposal mode, the control section 40 may cause the notification section 42 to notify that the liquid container 91 that is for disposal is mounted on the mount section 20. In other words, the control section 40 may issue a warning that the liquid container 91 that is for disposal should not be mounted in the mount section 20 and to detach the liquid container 91 that is for disposal.

When the disposal instruction is input by the input section 41, the control section 40 may not cause the notification section 42 to notify the remaining amount of the liquid contained in the liquid containers 24 and 91, and may cause the notification section 42 to notify that the disposal mode is set instead of the remaining amount of the liquid.

The liquid ejection device 11 may be provided with a flow path separate from the supply flow path 22. The liquid ejection device 11 may be provided with a recovery flow path. The recovery flow path is a flow path for recovering the liquid from the liquid ejection head 12 to the liquid containers 24 and 91.

The medium accommodation section on which the medium 90 is placed may be any of an accommodation tray capable of accommodating the medium 90 and a manual feed tray to which the medium 90 is manually fed.

At least any one of the medium 90 for overlap printing, the waste liquid container 92 that is for disposal, the liquid container 91 that is for disposal, the liquid vessel 93 for curing, and the curing agent may be packed together with the liquid ejection device 11, or may be separately obtained from a mass retailer, mail order, or the like. In addition, the information may be obtained with or without charge.

In the present embodiment, the present disclosure is employed in the liquid ejection device 11, but the present disclosure is not limited to this, and for example, the present disclosure may be employed in at least one of a control method and a program for the liquid ejection device 11. The control method of the liquid ejection device 11 is a method in which one or a plurality of computers execute various processes. The program causes one or a plurality of computers to execute various kinds of processing.

As used herein, the expression "at least one of" means one or more of the desired alternatives. As an example, the expression "at least one of" as used herein means only one option if the number of options is two or both of the two options. As another example, the expression "at least any" as used herein means only one option or a combination of any two or more options when the number of options is three or more.

Note

Hereinafter, technical ideas grasped from the above-described embodiment and modifications and operations and effects thereof will be described.

(A) liquid ejection device includes a liquid ejection head configured to eject liquid contained in a liquid container; a remaining amount detection section configured to detect the remaining amount of the liquid contained in the liquid container; an input section configured to input a predetermined instruction; and a control section configured to perform control based on the instruction input by the input section, wherein when an instruction related to disposal is not input by the input section, the control section regulates discharge of the liquid from the liquid ejection head after the remaining amount detection section detects that the remaining amount of the liquid contained in the liquid container falls below a first threshold and when the instruction related to disposal is input by the input section, the control section allows discharge of the liquid from the liquid ejection head after the remaining amount detection section detects that the remaining amount of the liquid contained in the liquid container falls below the first threshold.

According to this configuration, by inputting an instruction related to disposal, when the liquid ejection device is recycled, it is possible to suppress contamination of the pulverized parts and the surroundings of the liquid ejection device with the liquid. Therefore, the recyclability of the liquid ejection device can be improved.

(B) The above described liquid ejection device may be such that the control section is configured to, when the instruction related to disposal is input by the input section, execute control of ejecting a larger ejection amount of the liquid from the liquid ejection head to a predetermined region of a medium compared to when the instruction related to disposal is not input by the input section.

According to this configuration, by inputting the instruction related to disposal, it is possible to efficiently discharge the liquid remaining in the liquid ejection device. Therefore, the recyclability of the liquid ejection device can be improved.

(C) The above described liquid ejection device may further include a cleaning section configured to forcibly discharge the liquid from the liquid ejection head and a waste liquid mount section configured to attach and detach a waste liquid container configured to contain the liquid as waste liquid discharged from the liquid ejection head by the cleaning section.

According to this configuration, the waste liquid from the liquid ejection head can be discharged to the waste liquid container. In addition, even when the waste liquid from the liquid ejection head cannot be contained in one waste liquid container, the waste liquid from the liquid ejection head can also be contained in another mounted waste liquid container by mounting another waste liquid container. In this way, a large amount of waste liquid can be discharged from the liquid ejection head by inputting the instruction related to disposal. Therefore, the recyclability of the liquid ejection device can be improved.

(D) The above described liquid ejection device may further include a waste liquid detection section configured to detect a contained amount of waste liquid contained in the waste liquid container, wherein when the instruction related to disposal is input by the input section, the control section allows the waste liquid container to contain the waste liquid until the waste liquid detection section detects that the contained amount of waste liquid contained in the waste liquid container exceeds a second threshold and the control section regulates containment of waste liquid by the waste liquid container after the waste liquid detection section detects the contained amount of the waste liquid contained in the waste liquid container exceeds the second threshold.

According to this configuration, by inputting the instruction related to disposal, the waste liquid from the liquid ejection head can be efficiently discharged to the waste liquid container. Therefore, the recyclability of the liquid ejection device can be improved.

(E) The above described liquid ejection device may be such that the waste liquid mount section is configured such that a waste liquid container that is for disposal is attachable and detachable and the control section is configured to, when the instruction related to disposal is input by the input section, cause the notification section to perform notification for prompting the waste liquid container that is for disposal to be mounted on the waste liquid mounting section.

According to this configuration, by inputting the instruction related to disposal, the user can be made to recognize that the waste liquid container that is for disposal must be mounted. Thus, it is possible to increase the possibility of containing the waste liquid in the waste liquid container that is for disposal. Therefore, the recyclability of the liquid ejection device can be improved.

(F) The above described liquid ejection device may be such that the waste liquid mount section is configured such that the waste liquid container that is for disposal, in which a curing agent having a component for curing the waste liquid is contained in advance, is attachable and detachable.

According to this configuration, by mounting the waste liquid container that is for disposal, the waste liquid contained in the waste liquid container that is for disposal can be cured by the curing agent. Thus, when the liquid ejection device is recycled, it is possible to suppress contamination of the pulverized parts and the surroundings of the liquid ejection device with the liquid. Therefore, the recyclability of the liquid ejection device can be improved.

(G) The above described liquid ejection device may further include a cleaning section configured to forcibly discharge the liquid from the liquid ejection head; a waste liquid container configured to contain the liquid as waste liquid discharged from the liquid ejection head by the cleaning section; and a waste liquid detection section configured to detect a contained amount of waste liquid contained in the waste liquid container, wherein when the instruction related to disposal is input by the input section, the control section allows the waste liquid container to contain the waste liquid until the waste liquid detection section detects that the contained amount of waste liquid contained in the waste liquid container exceeds a second threshold and the control section regulates containment of waste liquid by the waste liquid container after the waste liquid detection section detects the contained amount of the waste liquid contained in the waste liquid container exceeds the second threshold.

According to this configuration, by inputting the instruction related to disposal, the waste liquid from the liquid ejection head can be efficiently discharged to the waste liquid container. Therefore, the recyclability of the liquid ejection device can be improved.

(H) The above described liquid ejection device may further include a mount section configured to enable attachment thereto and detachment therefrom the liquid container, wherein the mount section is configured such that a liquid container that is for disposal, in which a curing liquid having a component for curing the liquid is contained, is attachable and detachable.

According to this configuration, by mounting the liquid container that is for disposal, it is possible to increase the possibility of curing the liquid from the liquid container to the liquid ejection head. Thus, when the liquid ejection device is recycled, it is possible to suppress contamination of the pulverized parts and the surroundings of the liquid ejection device with the liquid. Therefore, the recyclability of the liquid ejection device can be improved.

(I) The above described liquid ejection device may further include the liquid container, wherein the liquid container has an inlet configured so as to enable injection of liquid, and the inlet is configured to enable insertion of an insertion port of a curing liquid vessel in which is contained a curing liquid having a component for curing the liquid.

According to this configuration, by introducing the curing liquid from the curing liquid vessel to the liquid container, it is possible to increase the possibility of curing the liquid from the liquid container to the liquid ejection head. Thus, when the liquid ejection device is recycled, it is possible to suppress contamination of the pulverized parts and the surroundings of the liquid ejection device with the liquid. Therefore, the recyclability of the liquid ejection device can be improved.

What is claimed is:

1. A liquid ejection device comprising:

a liquid ejection head configured to eject liquid contained in a liquid container;

a remaining amount detection section configured to detect the remaining amount of the liquid contained in the liquid container;

an input section configured to input a predetermined instruction;

a control section configured to perform control based on the instruction input by the input section;

a cleaning section configured to forcibly discharge the liquid from the liquid ejection head and a waste liquid mount section configured to attach and detach a waste liquid container configured to contain the liquid as waste liquid discharged from the liquid ejection head by the cleaning section;

a waste liquid detection section configured to detect a contained amount of waste liquid contained in the waste liquid container, wherein when an instruction related to disposal is not input by the input section, the control section regulates discharge of the liquid from the liquid ejection head after the remaining amount detection section detects that the remaining amount of the liquid contained in the liquid container falls below a first threshold, when the instruction related to disposal is input by the input section, the control section allows discharge of the liquid from the liquid ejection head after the remaining amount detection section detects that the remaining amount of the liquid contained in the liquid container falls below the first threshold, the control section allows the waste liquid container to contain the waste liquid until the waste liquid detection section detects that the contained amount of waste liquid contained in the waste liquid container exceeds a second threshold, and the control section regulates containment of waste liquid by the waste liquid container after the waste liquid detection section detects the contained amount of the waste liquid contained in the waste liquid container exceeds the second threshold.

2. The liquid ejection device according to claim 1, wherein the control section is configured to, when the instruction related to disposal is input by the input section, execute control of ejecting a larger ejection amount of the liquid from the liquid ejection head to a predetermined region of a medium compared to when the instruction related to disposal is not input by the input section.

3. The liquid ejection device according to claim 1, wherein the waste liquid mount section is configured such that a waste liquid container that is for disposal is attachable and detachable and the control section is configured to, when the instruction related to disposal is input by the input section, cause a notification section to perform notification for prompting the waste liquid container that is for disposal to be mounted on the waste liquid mounting section.

4. The liquid ejection device according to claim 3, wherein the waste liquid mount section is configured such that the waste liquid container that is for disposal, in which a curing agent having a component for curing the waste liquid is contained in advance, is attachable and detachable.

5. A liquid ejection device comprising:

a liquid ejection head configured to eject liquid contained in a liquid container;

a remaining amount detection section configured to detect the remaining amount of the liquid contained in the liquid container;

an input section configured to input a predetermined instruction;

a control section configured to perform control based on the instruction input by the input section;

a cleaning section configured to forcibly discharge the liquid from the liquid ejection head;

a waste liquid container configured to contain the liquid as waste liquid discharged from the liquid ejection head by the cleaning section; and a waste liquid detection section configured to detect a contained amount of waste liquid contained in the waste liquid container, wherein when the instruction related to disposal is input by the input section, the control section allows the waste liquid container to contain the waste liquid until the waste liquid detection section detects that the contained amount of waste liquid contained in the waste liquid container exceeds a second threshold, the control section regulates containment of waste liquid by the waste liquid container after the waste liquid detection section detects the contained amount of the waste liquid contained in the waste liquid container exceeds the second threshold, when an instruction related to disposal is not input by the input section, the control section regulates discharge of the liquid from the liquid ejection head after the remaining amount detection section detects that the remaining amount of the liquid contained in the liquid container falls below a first threshold and when the instruction related to disposal is input by the input section, the control section allows discharge of the liquid from the liquid ejection head after the remaining amount detection section detects that the remaining amount of the liquid contained in the liquid container falls below the first threshold.

6. The liquid ejection device according to claim 1, further comprising:

a mount section configured to enable attachment thereto and detachment therefrom the liquid container, wherein the mount section is configured such that a liquid container that is for disposal, in which a curing liquid having a component for curing the liquid is contained, is attachable and detachable.

7. The liquid ejection device according to claim 1, further comprising:

the liquid container, wherein the liquid container has an inlet configured so as to enable injection of liquid, and the inlet is configured to enable insertion of an insertion port of a curing liquid vessel in which is contained a curing liquid having a component for curing the liquid.

8. A liquid ejection device comprising:

a liquid ejection head configured to eject liquid contained in a liquid container;

a remaining amount detection section configured to detect the remaining amount of the liquid contained in the liquid container;

an input section configured to input a predetermined instruction; and a control section configured to perform control based on the instruction input by the input section, wherein when an instruction related to disposal is not input by the input section, the control section regulates discharge of the liquid from the liquid ejection head after the remaining amount detection section detects that the remaining amount of the liquid contained in the liquid container falls below a first threshold and when the instruction related to disposal is input by the input section, the control section (i) allows discharge of the liquid from the liquid ejection head after the remaining amount detection section detects that the remaining amount of the liquid contained in the liquid container falls below the first threshold and (ii) cause a notification section to perform notification for prompting positioning of a medium in a medium accommodation section to receive the liquid from the liquid ejection head.

9. The liquid ejection device according to claim 8, further comprising:

a cleaning section configured to forcibly discharge the liquid from the liquid ejection head and a waste liquid mount section configured to attach and detach a waste liquid container configured to contain the liquid as waste liquid discharged from the liquid ejection head by the cleaning section.

10. The liquid ejection device according to claim 9, further comprising:

a waste liquid detection section configured to detect a contained amount of waste liquid contained in the waste liquid container, wherein when the instruction related to disposal is input by the input section, the control section allows the waste liquid container to contain the waste liquid until the waste liquid detection section detects that the contained amount of waste liquid contained in the waste liquid container exceeds a second threshold and the control section regulates containment of waste liquid by the waste liquid container after the waste liquid detection section detects the contained amount of the waste liquid contained in the waste liquid container exceeds the second threshold.

11. The liquid ejection device according to claim 8, further comprising:

a cleaning section configured to forcibly discharge the liquid from the liquid ejection head;

a waste liquid container configured to contain the liquid as waste liquid discharged from the liquid ejection head by the cleaning section; and a waste liquid detection section configured to detect a contained amount of waste liquid contained in the waste liquid container, wherein when the instruction related to disposal is input by the input section, the control section allows the waste liquid container to contain the waste liquid until the waste liquid detection section detects that the contained amount of waste liquid contained in the waste liquid container exceeds a second threshold and the control section regulates containment of waste liquid by the waste liquid container after the waste liquid detection section detects the contained amount of the waste liquid contained in the waste liquid container exceeds the second threshold.

* * * * *